(12) United States Patent
Carraher et al.

(10) Patent No.: US 8,255,787 B2
(45) Date of Patent: Aug. 28, 2012

(54) AUTOMATED CONFIGURATION OF LOCATION-SPECIFIC PAGE ANCHORS

(75) Inventors: Theodore R. Carraher, Raleigh, NC (US); Jake Palmer, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 12/493,973

(22) Filed: Jun. 29, 2009

(65) Prior Publication Data

US 2010/0332965 A1 Dec. 30, 2010

(51) Int. Cl.
*G06F 17/27* (2006.01)
*G06F 17/28* (2006.01)
*G06F 7/00* (2006.01)
*G06F 17/30* (2006.01)
*G06F 15/16* (2006.01)

(52) U.S. Cl. ........................................ 715/206; 707/755
(58) Field of Classification Search .................. 715/206; 707/755
See application file for complete search history.

(56) References Cited

U.S. PATENT DOCUMENTS

| 7,788,245 | B1 | 8/2010 | Eddings et al. | |
|---|---|---|---|---|
| 2002/0103829 | A1 | 8/2002 | Manning et al. | |
| 2005/0027702 | A1 | 2/2005 | Jensen et al. | |
| 2006/0074999 | A1* | 4/2006 | Chidlovskii | 707/201 |
| 2007/0130100 | A1 | 6/2007 | Miller | |
| 2007/0168465 | A1* | 7/2007 | Toppenberg et al. | 709/218 |
| 2007/0283245 | A1* | 12/2007 | Masood | 715/513 |
| 2009/0094137 | A1* | 4/2009 | Toppenberg et al. | 707/100 |
| 2010/0023850 | A1* | 1/2010 | Jagdale et al. | 715/206 |

OTHER PUBLICATIONS

Author Unknown, Links in HTML Documents, Website/page http://www.w3.org/TR/html401/struct/links.html, Printed from website on Jun. 11, 2009, pp. 1-12, W3C HTML 4.01 Specification, Published on the World Wide Web.
Author Unknown, Show Anchors 2.1, Website/page https://addons.mozilla.org/en-US/firefox/addon/416, Printed from website on Jun. 11, 2009, pp. 1-3, Add-ons for Firefox, Published on the World Wide Web.
United States Patent and Trademark Office, Office Action for U.S. Appl. No. 12/494,051, filed Sep. 28, 2011, pp. 1-24, Alexandria, VA, USA.
United States Patent and Trademark Office, Office Action for U.S. Appl. No. 12/494,051, filed Feb. 2, 2012, pp. 1-28, Alexandria, VA, USA.
United States Patent and Trademark Office, Notice of Allowance for U.S. Appl. No. 12/494,051, Apr. 9, 2012, 2012, pp. 1-13, Alexandria, VA, USA.

* cited by examiner

*Primary Examiner* — Greta Robinson
*Assistant Examiner* — Brian E. Weinrich
(74) *Attorney, Agent, or Firm* — Lee Law, PLLC; Christopher B. Lee

(57) ABSTRACT

A request is received via an input device of a computing device for a hypertext link to an item of web content rendered on a display of the computing device. It is determined whether a markup language (ML) document used to render the web content includes an existing page anchor proximate to an item reference within the ML document. The hypertext link is configured based upon the determination of whether the ML document includes the existing page anchor proximate to the item reference within the ML document. The configured hypertext link is returned in response to the request.

24 Claims, 7 Drawing Sheets

600

```
<HTML>
<HEAD>
. . .
</HEAD>                  602
<BODY>
. . .
        <div id="headerMenu">
                . . .
                <img src="images/logo.gif" /a>
                . . .
        </div>            604
    . . .
</BODY>                              606
</HTML>
```

FIG. 6

AUTOMATED CONFIGURATION OF LOCATION-SPECIFIC PAGE ANCHORS

RELATED APPLICATIONS

This application is related to concurrently filed U.S. utility patent application Ser. No. 12/494,051, titled "SEARCH ENGINE OPTIMIZATION USING PAGE ANCHORS," which is incorporated herein by reference in its entirety.

BACKGROUND

The present invention relates to page anchors associated with renderable web content. More particularly, the present invention relates to location-specific page anchors.

Web content includes text, images, and other information that may be rendered on a display of a computing device. One approach to creation of web content is to create a markup language (ML) document that organizes the web content for rendering. The ML document may be transferred between devices via communication protocols, such as hypertext transfer protocol (HTTP). Upon receipt at the computing device, the ML document is processed to render the web content for viewing on the display of the computing device.

SUMMARY

A method includes receiving a request, via an input device of a computing device, for a hypertext link to an item of web content rendered on a display of the computing device; determining whether a markup language (ML) document used to render the web content comprises an existing page anchor proximate to an item reference within the ML document used to render the item of web content; configuring the hypertext link based upon the determination of whether the ML document comprises the existing page anchor proximate to the item reference within the ML document used to render the item of web content; and returning the configured hypertext link in response to the request.

A system includes an input device; a display, and a processor programmed to: receive a request, via the input device, for a hypertext link to an item of web content rendered on the display; determine whether a markup language (ML) document used to render the web content comprises an existing page anchor proximate to an item reference within the ML document used to render the item of web content; configure the hypertext link based upon the determination of whether the ML document comprises the existing page anchor proximate to the item reference within the ML document used to render the item of web content; and return the configured hypertext link in response to the request.

An alternative system includes an input device; a display; and a processor programmed to: receive a request, via the input device, for a hypertext link to an item of web content rendered on the display; determine that a markup language (ML) document used to render the web content comprises an existing page anchor proximate to an item reference within the ML document used to render the item of web content; determine a direction from the existing page anchor to the item reference within the ML document; create a direction indicator based upon the determined direction; calculate a distance offset from the existing page anchor to the item reference within the ML document; form the hypertext link as a uniform resource locator (URL) to the ML document; append the existing page anchor, the direction indicator, and the distance offset to the URL; and return the configured hypertext link in response to the request.

A computer program product includes a computer readable storage medium including a computer readable program. The computer readable program when executed on a computer causes the computer to receive a request, via an input device, for a hypertext link to an item of web content rendered on a display; determine whether a markup language (ML) document used to render the web content comprises an existing page anchor proximate to an item reference within the ML document used to render the item of web content; configure the hypertext link based upon the determination of whether the ML document comprises the existing page anchor proximate to the item reference within the ML document used to render the item of web content; and return the configured hypertext link in response to the request.

BRIEF DESCRIPTION OF THE SEVERAL VIEWS OF THE DRAWINGS

Figure (FIG.) 1 is a block diagram of an example of an implementation of a system for automated configuration of location-specific page anchors according to an embodiment of the present subject matter;

Figure (FIG.) 2 is a block diagram of an example of an implementation of a core processing module that is capable of performing automated configuration of location-specific page anchors according to an embodiment of the present subject matter;

Figure 4A:
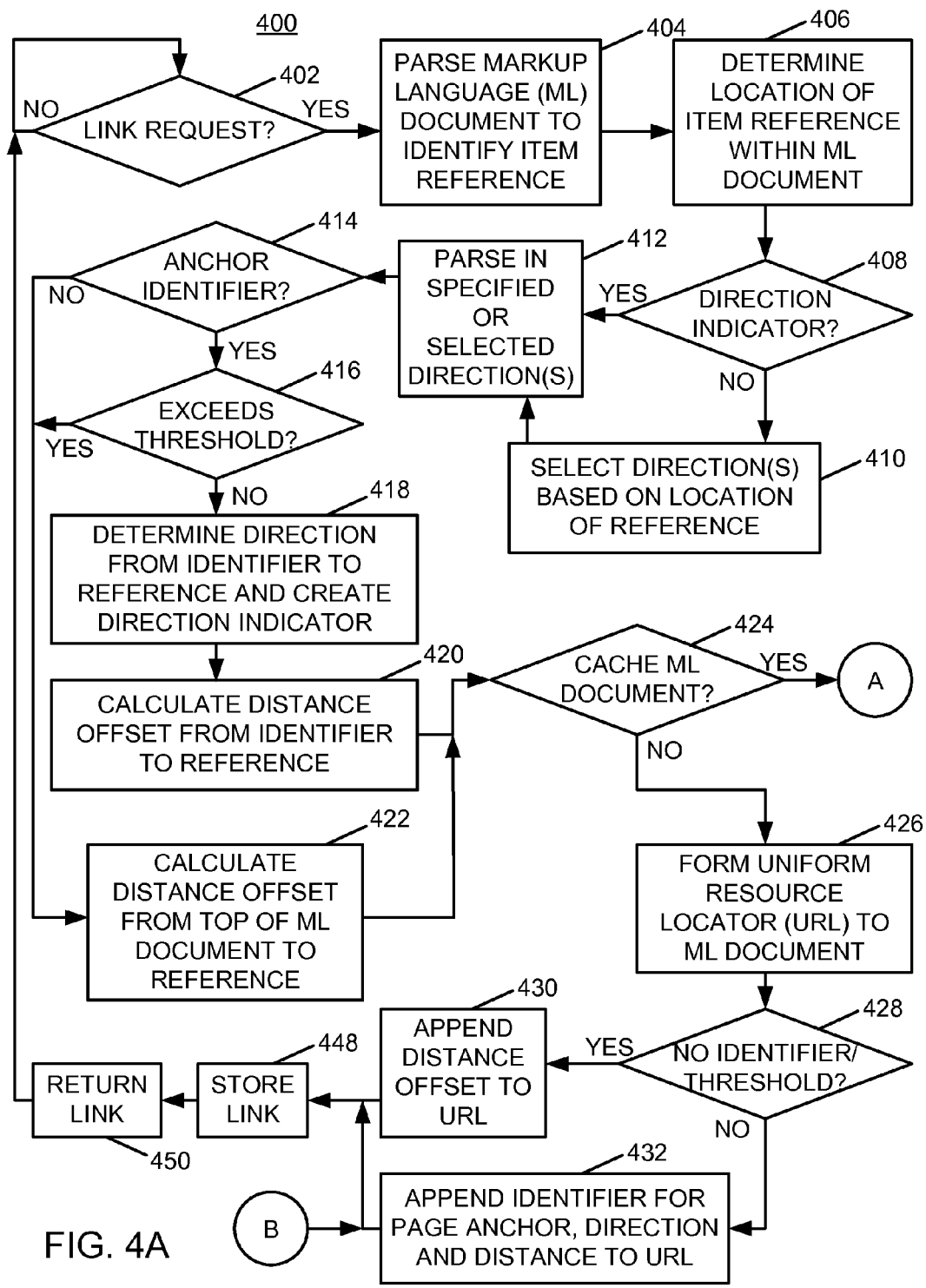

Figure (FIG.) 3 is a flow chart of an example of an implementation of a process for automated configuration of a location-specific page anchor to an item of web content rendered on a display of a computing device according to an embodiment of the present subject matter;

Figure (FIG.) 4A is a flow chart of an example of an implementation of initial processing within a process for automated configuration of location-specific page anchors by identifying existing anchors, calculating an offset and a distance from any existing anchor, and optionally caching an inserted location-specific page anchor according to an embodiment of the present subject matter;

Figure (FIG.) 4B is a flow chart of an example of an implementation of additional processing of the process for automated configuration of location-specific page anchors of FIG. 4A according to an embodiment of the present subject matter; and Figure (FIG.) 5 is a flow chart of an example of an implementation of a process for processing created location-specific page anchors according to an embodiment of the present subject matter.

Figure (FIG.) 6 is a diagram of an example of an implementation of markup language (ML) content that shows an item reference according to an embodiment of the present subject matter.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides location-specific page anchors for web content. A user that is viewing rendered web content on a display of a computing device may decide that a particular item of the rendered web content may be of interest to a friend or coworker. The user may request a hypertext link to the item via an input device, such as via a mouse or keypad. Upon receipt of the request, the computing device determines a location of an item reference within a markup language (ML) document used to render the item of web content, configures a hypertext link to the item of web content including a location-specific page anchor, and returns the configured hypertext link via a display to the user in response to the request. (See FIG. 6, element 606, which utilizes a markup language "src" identifier as an example of an item reference to renderable image content within this example, though it is understood that there are many types of items of content that may be rendered and many types of item references may be used to render the respective items of content, and all are considered within the scope of the present subject matter). The returned location-specific page anchor may be stored or distributed. The request for the hypertext link received from the user may also include a user-selected direction indicator designating a direction in which to search for an existing page anchor relative to the item reference for the item of rendered web content. An existing page anchor threshold distance relative to the item reference within the ML document may be configured to expedite parsing and rendering activities associated with location-specific page anchors.

For purposes of the present subject matter, an ML document may include, for example, a hypertext markup language (HTML), an extensible markup language (XML), and a standard generalized markup language (SGML). Many other markup languages exist and all are considered within the scope of the present subject matter.

Location-specific page anchors may be created in association with an ML document in a variety of ways. The following introduction provides a few examples of location-specific page anchors. It is understood that many other variations of location-specific page anchors are possible based upon the present description and all are considered within the scope of the present subject matter.

As a first example, location-specific page anchors may be created by using markup language tags (e.g., <a name="?"/>). Markup language tags that include attributes with an identifier field (e.g., "id") may also serve as location-specific page anchors (e.g., <div id="?">, <td id="?">). (See FIG. 6 elements 602 and 604 for additional examples). Existing markup language tags within an ML document may be considered and used as existing page anchors for certain processing associated with the present subject matter.

A hypertext link may be configured to include an existing page anchor to an item of web content by appending information to a uniform resource locator (URL) for the ML document. For example, when an existing page anchor suitable for use as a location-specific page anchor is found within an ML document in close proximity to the item reference, the existing page anchor may be appended to the URL for the ML document as shown in the following example:

http(s)://server_name/(page_path/)#existing_anchor_name

Additionally, if a suitable existing page anchor is found relative (e.g., proximate) to a reference to the item of web content within the ML document for which a location-specific page anchor is to be created, yet not in close proximity to the item reference, a direction indicator and a distance offset from the existing page anchor to the item of web content may be determined and appended to the URL along with the existing page anchor. For example, an existing anchor name, a direction indicator (e.g., "up," "down"), and a distance offset (e.g., a number of lines of text, a number of pages of text, a number of renderable elements, spatial layout, proximity of spatial layout, etc.) may be appended to the URL as shown in the following example:

http(s)://server_name/(page_path/)#existing_anchor_name#direction#distance

Similarly, if a suitable existing page anchor is not found proximate to the reference to the item of web content within the ML document (e.g., either no existing page anchor is found or the configured existing page anchor threshold distance relative to the item reference has been exceeded during parsing for existing page anchors), a distance offset from a top of the ML document to the item of web content may be appended to the URL. For example, a distance offset may be appended to the URL as shown in the following example:

http(s)://server_name/(page_path/)#distance

Alternatively, a hypertext link may be configured to include a location-specific page anchor to an item of web content by inserting a page anchor into a copy of the ML document proximate to the reference to the item of web content, caching the ML document, and appending the inserted page anchor to a URL for the cached ML document. For example, a created location-specific page anchor name inserted into a cached copy of an ML document may be appended to the URL as shown in the following example:

http(s)://caching server_name/(page_path/)#inserted_anchor_name

For cache storage of ML documents, a cache storage duration may be configured. As such, inserted location-specific page anchors may be deleted after expiration of a configured cache storage duration.

Each of the examples described above provides a location-specific page anchor in association with a hypertext link to a URL for an ML document for purposes of the present description. The automated configuration of location-specific page anchors described herein may be performed in real time to allow prompt return of hypertext links to items of rendered web content. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
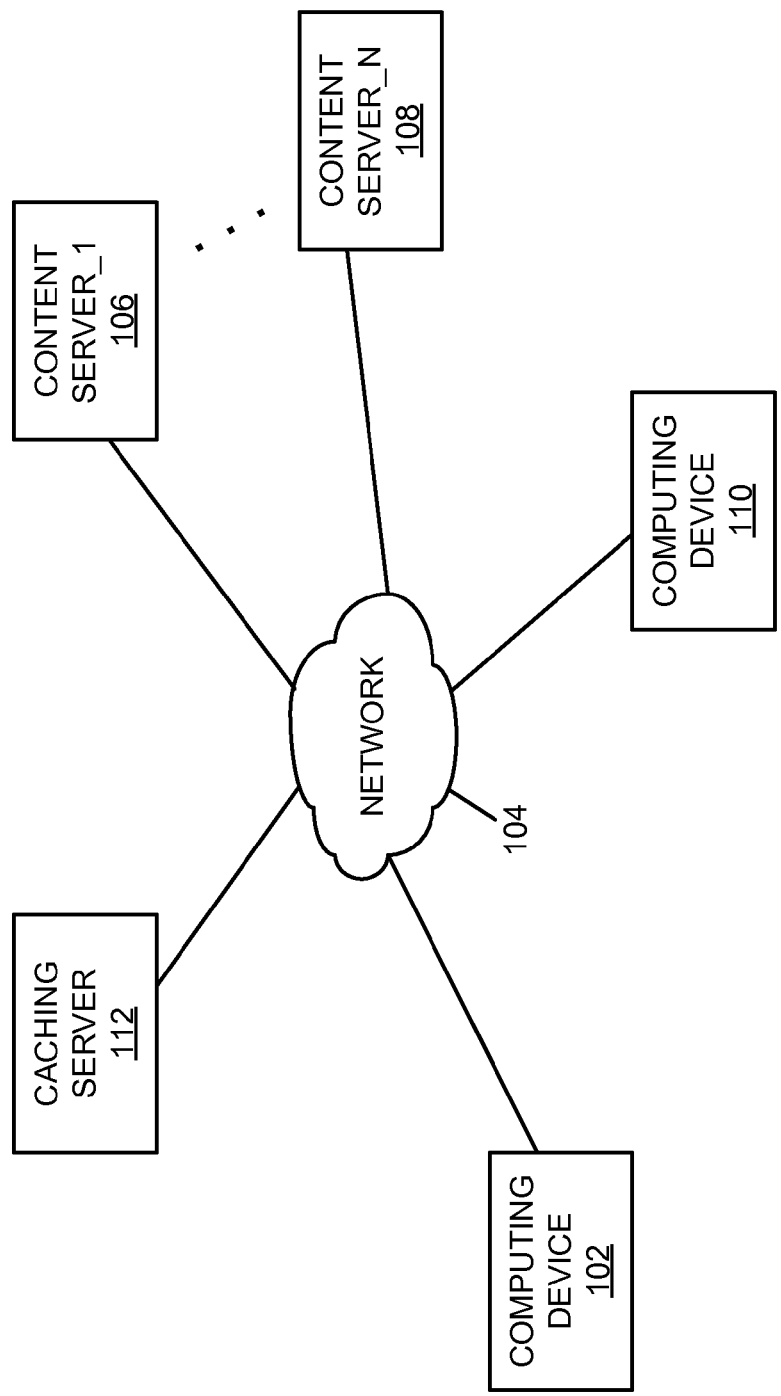

FIG. 1 is a block diagram of an example of an implementation of a system 100 for automated configuration of location-specific page anchors. Within the system 100, a computing device 102 is illustrated interconnected via a network 104 to a content server_1 106 through a content server_N 108. The computing device 102 is also interconnected via the network 104 to a computing device 110 and a caching server 112.

The content server_1 106 through the content server_N 108 provide web content that may be accessed by the computing device 102. As such, the content server_1 106 through the content server_N 108 represent web servers and other content servers for purposes of the present description.

As will be described in more detail below in association with FIGS. 2 through 5, the computing device 102 provides automated configuration of location-specific page anchors based upon determinations of whether an ML document used to render an item of web content includes a suitable existing page anchor proximate to an item reference for the rendered item of web content within the ML document. If a suitable existing page anchor is identified, a direction indicator and a distance offset are generated. The existing anchor along with the direction indicator and the distance offset are appended to a URL for the ML document and returned, stored, or otherwise distributed for providing a hypertext link directly to the item of rendered web content. As discussed above, if a suitable existing page anchor is not identified, the computing device 102 may configure a location-specific page anchor to the item of rendered web content by appending a distance offset from a top of the ML document to the item reference within the ML document to the URL.

As an alternative, the computing device 102 may make a copy of the ML document used to render the web content, insert a location-specific page anchor into the copy of the ML document, and store the copy of the ML document with the inserted location-specific page anchor. The computing device 102 may then configure a URL to the stored copy of the ML document with the inserted location-specific page anchor appended. The caching server 112 may automatically configure location-specific page anchors in response to requests from the computing device 102 to configure a location-specific page anchor to an item of rendered web content and may cache a copy of an ML document with an inserted page anchor and a configured location-specific page anchor in response to a request from the computing device 102 to cache the configured location-specific page anchor on behalf of the computing device 102. Many other variations of location-specific page anchor configuration are possible and all are considered within the scope of the present subject matter.

A configured location-specific page anchor may be stored and shared with colleagues or friends to provide hyperlinks directly to items of rendered content. For example, an appended location-specific page anchor may be configured with either a distance offset from a top/bottom of an ML document, or a direction indication and a distance offset from an existing page anchor. The configured hypertext link may further be provided to reference the item of web content within the ML document as stored on one or more of the content server_1 106 through the content server_N 108. For an inserted and cached location-specific page anchor stored in association with the caching server 112, a user of the computing device 110 may be provided with a hypertext link to the cached copy of the ML document with the appended (and inserted) location-specific page anchor. The computing device 110 may then access the cached copy of the ML document within the inserted location-specific page anchor via the caching server 112 using the provided hypertext link.

It should be noted that the computing device 102 may be a portable computing device, either by a user's ability to move the computing device 102 to different locations, or by the computing device 102's association with a portable platform, such as a plane, train, automobile, or other moving vehicle. It should also be noted that the computing device 102 may be any computing device capable of processing information as described above and in more detail below. For example, the computing device 102 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The network 104 may include any form of interconnection suitable for the intended purpose. For example, the network 104 may include a private or public network such as an intranet or the Internet, respectively, direct inter-module interconnection, dial-up, wireless, or any other interconnection mechanism capable of interconnecting the devices with the system 100.

Figure 2:
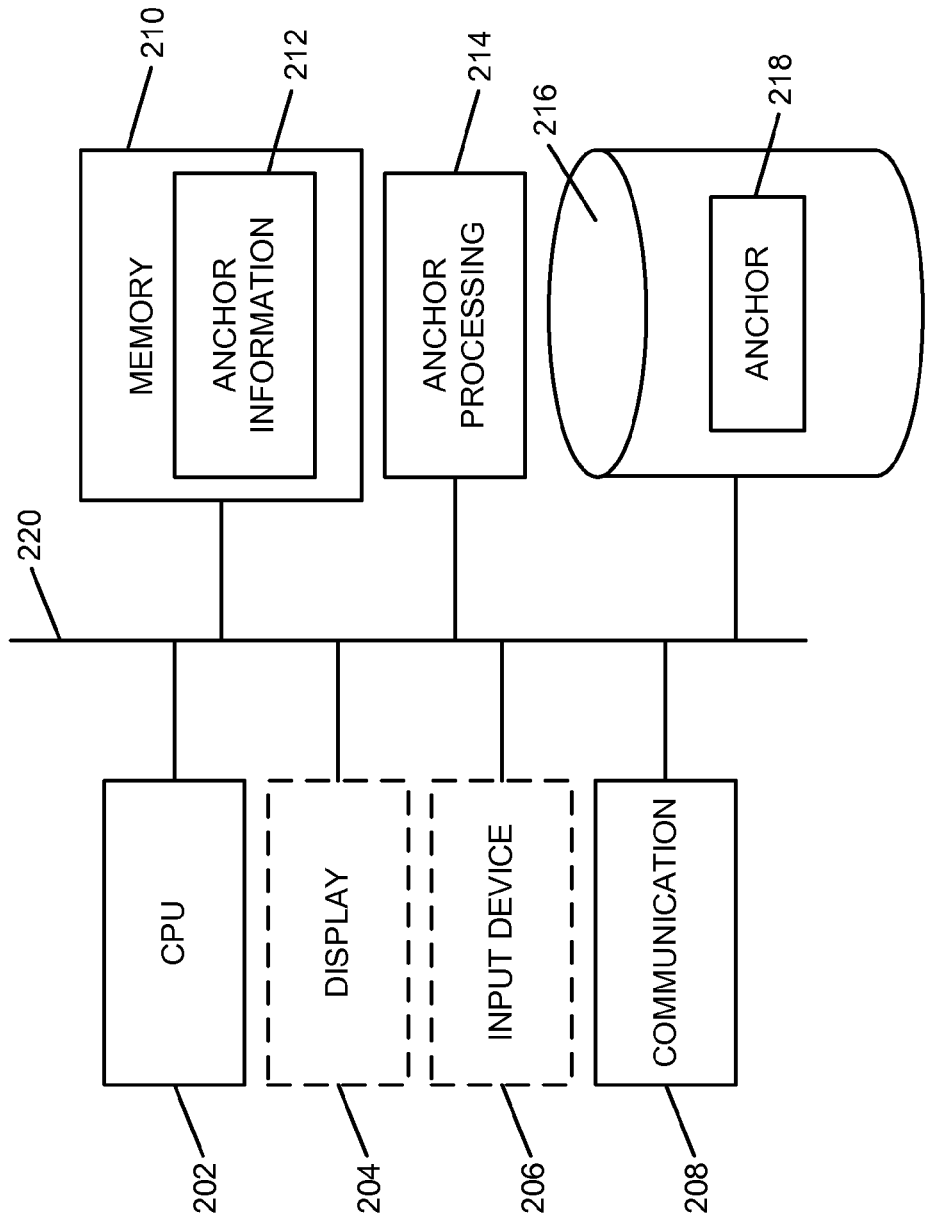

FIG. 2 is a block diagram of an example of an implementation of a core processing module 200 that is capable of performing automated configuration of location-specific page anchors. The core processing module 200 may be configured for use on either the computing device 102 or the caching server 112 to provide automated configuration of location-specific page anchors, as described in more detail below. A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. For example, the caching server 112 may operate without user interface functionality, while the computing device 102 may utilize the display 204 and the input device 206. Accordingly, the core processing module 200 may operate as a completely automated embedded device without user configurability or feedback. However, the core processing module 200 may also provide user feedback and configurability via the display 204 and the input device 206, respectively.

A communication module 208 provides interconnection capabilities that allow the core processing module 200 to communicate with other modules within the system 100, such as the content server_1 106 through the content server_N 108, to retrieve web content. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes an anchor information storage area 212 that stores information used to configure location-specific page anchors within the core processing module 200.

For example, the anchor information storage area 212 may be used to store information during formation and creation of location-specific page anchors. This information may include presence information for existing anchors, existing anchor location information, direction information relative to either existing anchors or a top or bottom of an ML document used to render a selected item of content, distance offset information, and other information associated with location-specific page anchors. Many other possibilities exist for information storage in association with formation and creation of location-specific page anchors and all are considered within the scope of the present subject matter. As will be described in more detail below, configured location-specific page anchors automate and expedite rendering actions for identified items of web content, such as scrolling operations for web content rendering and related processing.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, a code execution area, and a data area without departure from the scope of the present subject matter.

The core processing module 200 also includes an anchor processing module 214. The anchor processing module 214 implements the automated configuration of location-specific page anchors for the core processing module 200. Though the anchor processing module 214 is illustrated as a component-level module for ease of illustration and description purposes, it should be noted that the anchor processing module 214 may include any hardware, programmed processor(s), and memory used to carry out the functions of the anchor processing module 214 as described above and in more detail below. For example, the anchor processing module 214 may include additional controller circuitry in the form of application specific integrated circuits (ASICs), processors, and/or discrete integrated circuits and components for performing communication and electrical control activities associated with the anchor processing module 214. Additionally, the anchor processing module 214 may also include interrupt-level, stack-level, and application-level modules as appropriate. Furthermore, the anchor processing module 214 may include any memory components used for storage, execution, and data processing for performing processing activities associated with the anchor processing module 214.

It should also be noted that the anchor processing module 214 may also form a portion of other circuitry described without departure from the scope of the present subject matter. Further, the anchor processing module 214 may alternatively be implemented as an application stored within the memory 210. In such an implementation, the anchor processing module 214 may include instructions executed by the CPU 202 for performing the functionality described herein. The CPU 202 may execute these instructions to provide the processing capabilities described above and in more detail below for the core processing module 200. The anchor processing module 214 may form a portion of an interrupt service routine (ISR), a portion of an operating system, a portion of a browser application, or a portion of a separate application without departure from the scope of the present subject matter.

A database 216 is associated with the core processing module 200 and provides storage capabilities for information associated with the automated configuration of location-specific page anchors of the core processing module 200. The database 216 includes an anchor storage area 218 that may be stored in the form of tables or other arrangements accessible by the core processing module 200. The anchor storage area 218 includes storage for configured location-specific page anchors and hypertext links with location-specific page anchors appended associated with accessed web content as available from one or more of the content server_1 106 through the content server_N 108.

The CPU 202, the display 204, the input device 206, the communication module 208, the memory 210, the anchor processing module 214, and the database 216 are interconnected via an interconnection 220. The interconnection 220 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the anchor storage area 218 is shown within the database 216, it may also be stored within the memory 210 without departure from the scope of the present subject matter. Accordingly, the core processing module 200 may take many forms and may be associated with many platforms.

Figure 3:
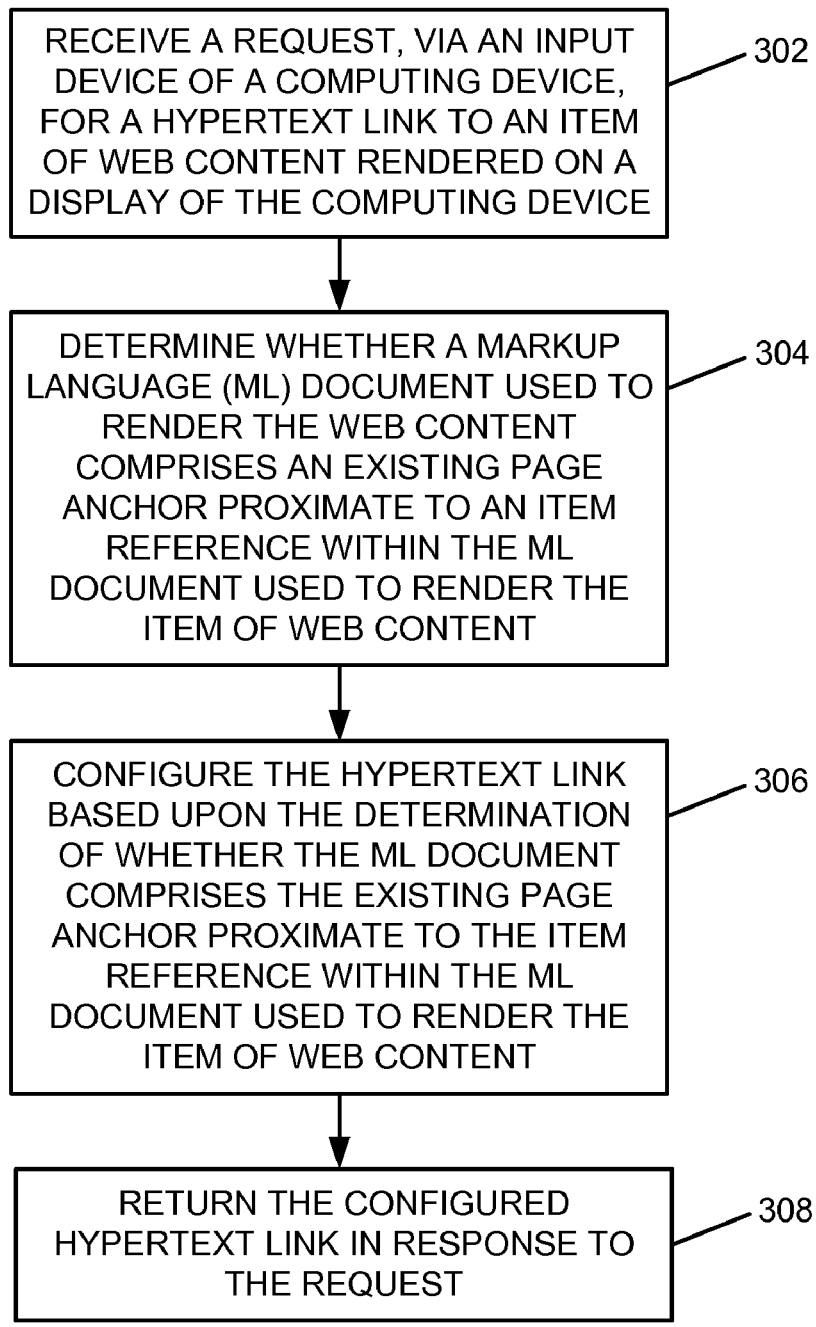
Figure 4B:
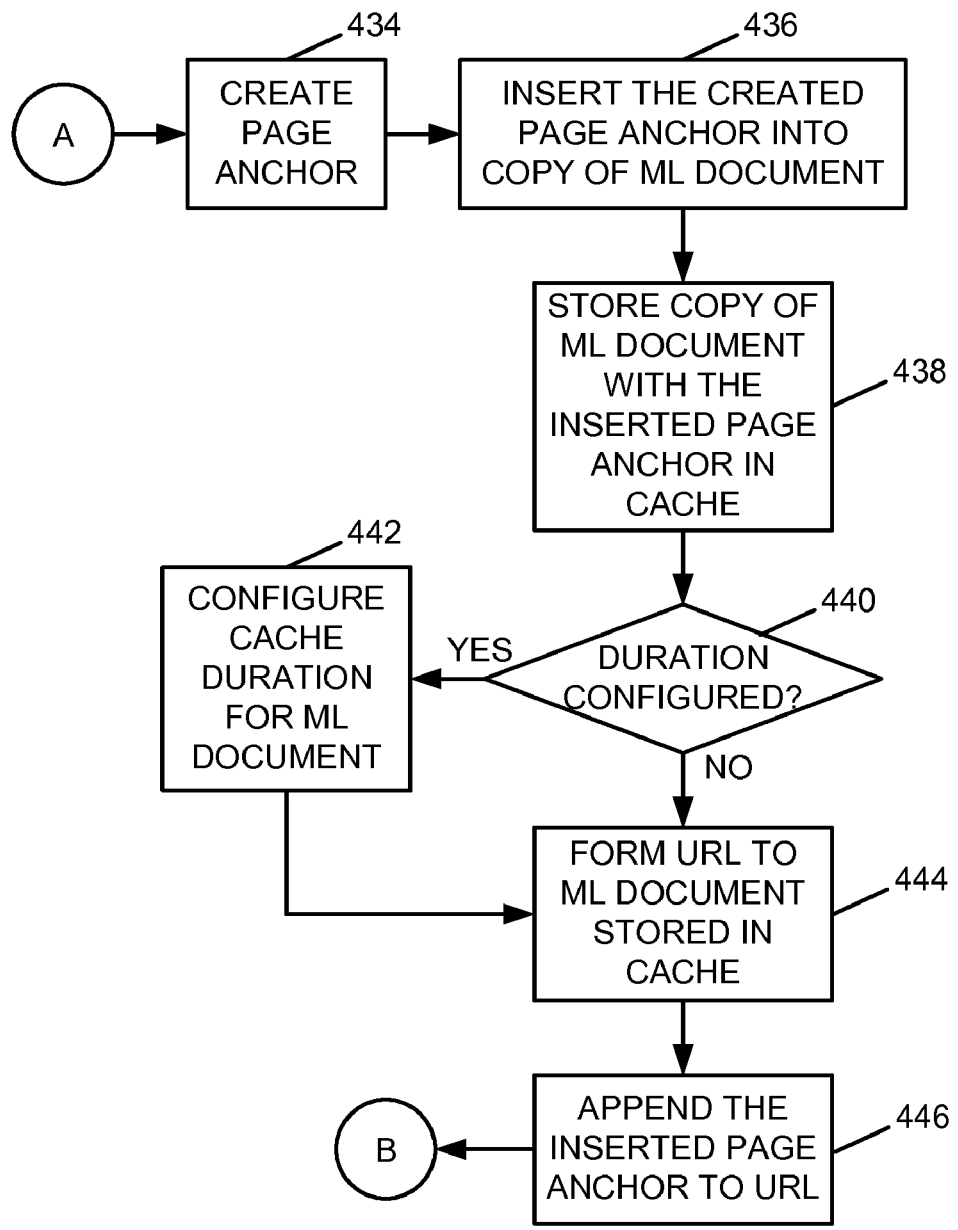
Figure 5:
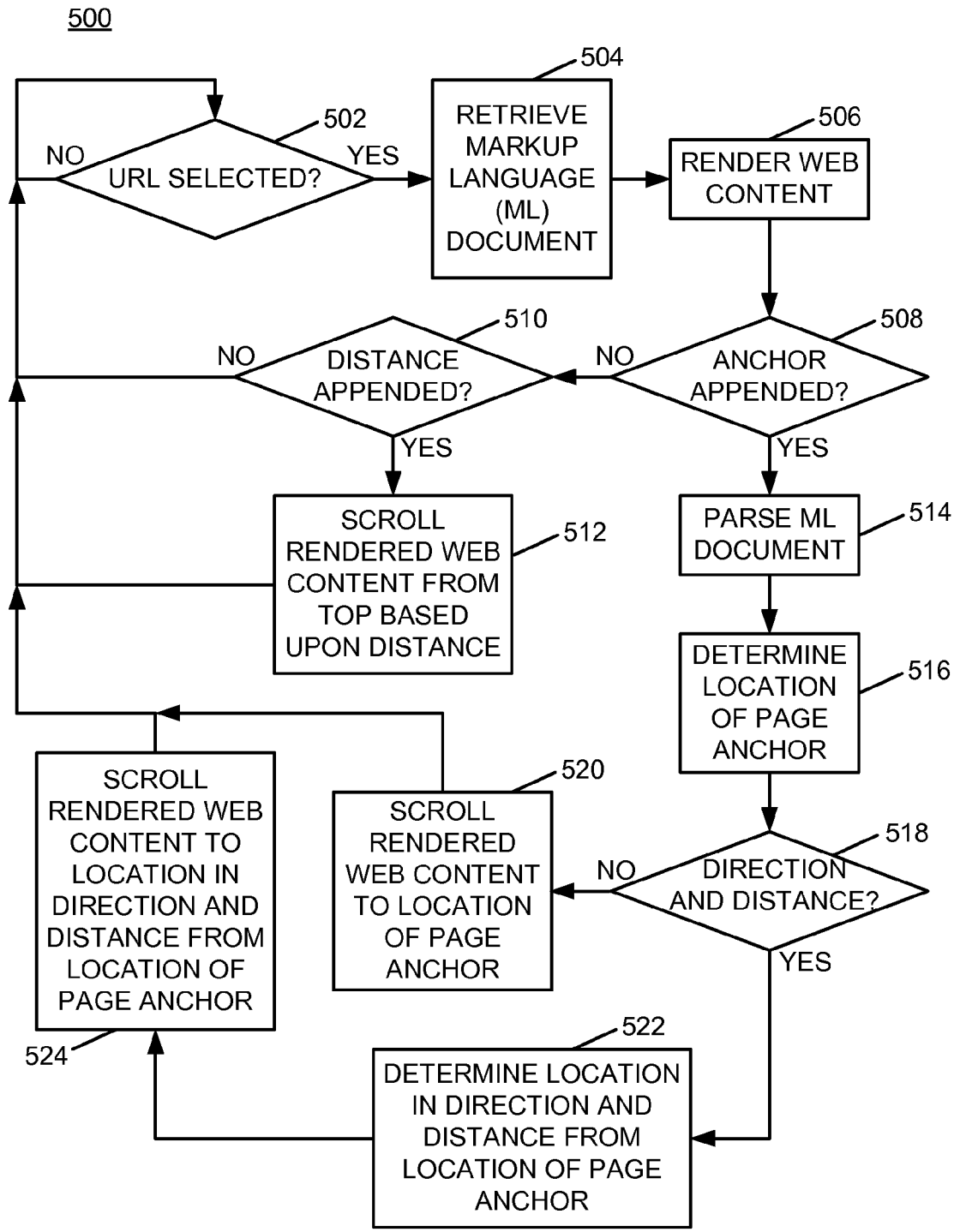

FIG. 3 through FIG. 5 below describe example processes that may be executed by devices, such as the computing device 102 or the caching server 112, to provide processing associated with the automated configuration of location-specific page anchors, according to the present subject matter. Many other variations on the examples processes are possible and all are considered within the scope of the present subject matter. The example processes may be performed by modules, such as the anchor processing module 214 and/or executed by the CPU 202. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for automated configuration of a location-specific page anchor to an item of web content rendered on a display of a computing device. At block 302, the process 300 receives a request, via an input device of a computing device, for a hypertext link to an item of web content rendered on a display of the computing device. At block 304, the process 300 determines whether a markup language (ML) document used to render the web content comprises an existing page anchor proximate to an item reference within the ML document used to render the item of web content. At block 306, the process 300 configures the hypertext link based upon the determination of whether the ML document comprises the existing page anchor proximate to the item reference within the ML document used to render the item of web content. At block 308, the process 300 returns the configured hypertext link in response to the request.

FIGS. 4A-4B illustrate a flow chart of an example of an implementation of a process 400 for automated configuration of location-specific page anchors by identifying existing anchors, calculating an offset and a distance from any existing anchor, and optionally caching an inserted location-specific page anchor. FIG. 4A illustrates initial processing within the process 400. At decision point 402, the process 400 waits for a link request associated with an item of web content rendered on a display, such as the display 204 of the computing device 102. The link request may, for example, be received via the input device 206 from a user of the computing device 102 or may be received via a network connection at the caching server 112 from the computing device 102. When a determination is made that a link request has been received, the process 400 parses an ML document to identify an item reference used to render the item of web content at block 404. At block 406, the process 400 determines a location of the item reference within the ML document. At decision point 408, the process 400 determines whether a direction indicator that specifies a direction for search of an existing page anchor within the ML document was specified in association with the link request.

It should be noted that the direction indicator may indicate to search from the item reference toward a beginning of the ML document. Alternatively, the direction indicator may indicate to search from the item reference toward an end of the ML document. As another alternative, the direction indicator may indicate to search in both directions to identify a closest existing page anchor without departure from the scope of the present subject matter.

When a determination is made at decision point 408 that a direction indicator has not been specified in association with the link request, the process 400 selects a direction based upon a location of the item reference within the ML document at block 410. For example, if the item reference is near the beginning of the ML document, the process 400 may select a reverse direction toward the beginning of the ML document in which to search for an existing anchor. In such a situation, the process 400 may encounter the beginning of the ML document prior to encountering an existing page anchor. Alternatively, if the item reference is near a middle of the ML document the process 400 may select a direction toward the beginning, end, or both directions concurrently in which to search for an existing page anchor. Additionally, if the item reference is near an end of the ML document the process 400 may select a forward direction toward the end of the ML document in which to search for the existing anchor. When a determination is made that a direction indicator was specified in association with the link request or upon selecting one or more directions in which to search for an existing page anchor, the process 400 parses the ML document in the specified direction(s) for existing page anchors at block 412.

At decision point 414, the process 400 makes a determination as to whether an existing page anchor identifier has been found within the ML document. When a determination is made that an existing page anchor identifier has been found within the ML document, the process 400 determines whether the existing page anchor is beyond an existing page anchor threshold distance relative to the item reference within the ML document at decision point 416. For example, an existing page anchor threshold distance may be configured by a user via the input device 206 for any suitable range of distance, such as a few paragraphs or pages of text associated with the ML document, for use of existing page anchors in the creation of location-specific page anchors. In such a situation, if the process 400 has identified an existing page anchor beyond the configured existing page anchor threshold distance, the process 400 may use a top of the ML document or other suitable reference for creation of location-specific page anchors.

When the process 400 determines that the existing page anchor threshold distance has not been exceeded, the process 400 determines in which of the selected one or more directions the existing page anchor identifier has been identified within the ML document and creates a direction indicator based upon the determined direction at block 418. At block 420, the process 400 calculates a distance offset from the existing page anchor to the item reference within the ML document.

When a determination is made at decision point 414 that an existing page anchor identifier has not been found within the ML document or when a determination is made at decision point 416 that the existing page anchor threshold distance has been exceeded, the process 400 calculates a distance offset from the beginning (e.g., top) of the ML document to the item reference at block 422.

Upon calculating the distance offset from the existing page anchor to the item reference within the ML document at block 420 or upon calculating a distance offset from the top of the ML document to the item reference at block 422, the process 400 makes a determination as to whether to cache a copy of the ML document and insert a location-specific page anchor at decision point 424. This determination may be based, for example upon the calculated distance offset exceeding a configured distance threshold. A configured distance threshold may be established and stored within the anchor information storage area 212, in the memory 210, or elsewhere as suitable for a given implementation. The configured distance threshold may specify a maximum distance for which existing page anchors may be used for location-specific page anchor configuration. Alternatively, caching of copies of ML documents with inserted location-specific page anchors may be based upon determining that the ML document does not include an existing page anchor proximate to the item reference within the ML document. Many other variations on decision making associated with caching of ML documents with inserted location-specific page anchors are possible and all are considered within the scope of the present subject matter.

When a determination is made not to cache a copy of the ML document with inserted location-specific page anchors at decision point 424, the process 400 forms a hypertext link as a uniform resource locator (URL) to the ML document at block 426. At decision point 428, the process 400 makes another determination as to whether an existing page anchor identifier was found within the ML document previously or whether the existing page anchor threshold distance has been exceeded. It should be noted that these determinations may be stored as flags or other indications within the anchor information storage area 212, in the memory 210 to expedite processing, or elsewhere as suitable for a given implementation. When a determination is made that an existing page anchor identifier was not found within the ML document or the existing page anchor threshold distance has been exceeded, the process 400 appends the calculated distance offset from the top of the ML document to the URL for the ML document at block 430. When a determination is made that an existing page anchor identifier was found within the ML document or that the existing page anchor threshold distance has not been exceeded, the process 400 appends the existing page anchor, the direction indicator, and the calculated distance offset to the URL for the ML document at block 432.

Returning to the description of decision point 424, when a determination is made to cache a copy of the ML document with an inserted location-specific page anchor, the process 400 transitions to the processing described in association with FIG. 4B below.

FIG. 4B illustrates additional processing associated with the process 400 for automated configuration of location-specific page anchors. At block 434, the process 400 creates a page anchor for the item reference for the rendered item of web content within the ML document. At block 436, the process 400 inserts the created page anchor into a copy of the ML document at the location associated with the item reference within the ML document. At block 438, the process 400 stores the copy of the ML document including the inserted page anchor. The copy of the ML document including the inserted page anchor may be stored within a local memory, such as the memory 210 or the computing device 102 or within the memory 210 of the caching server 112 to allow access to the copy of the ML document with the inserted page anchor by other devices within the system 100.

It should also be noted that when the process 400 is executed by a device, such as the computing device 102, processing for storage of the copy of the ML document including the inserted page anchor in association with the caching server 112 may include additional communication processing to transfer the information to be cached from the computing device 102 to the caching server 112. This additional processing is not illustrated for ease of illustration purposes. However, it is understood that any such processing is considered within the scope of the present subject matter.

At decision point 440, the process 400 makes a determination as to whether a caching duration for storage of the ML document including the inserted page anchor within the cache has been established. The caching duration may be stored within the anchor information storage area 212, in the memory 210, or elsewhere as suitable for a given implementation. When a determination is made that a caching duration has been established, the process 400 configures a caching duration for storage of the ML document including the inserted page anchor within the cache at block 442. By configuring a caching duration for storage of an ML document within a cache, the process 400 may further include processing for deleting the ML document including the inserted page anchor from the cache upon expiration of the caching duration. Additional processing for managing cache storage duration is not illustrated for ease of illustration purposes. However, it is understood than any such processing is considered within the scope of the present subject matter.

Upon configuring the caching duration for storage of the ML document including the inserted page anchor within the cache or upon determining that a caching duration for storage of the ML document including the inserted page anchor within the cache has not been established, the process 400 forms a hypertext link as a URL to the copy of the ML document including the inserted page anchor stored in the cache at block 444. At block 446, the process 400 appends the inserted location-specific page anchor to the URL and returns to continue processing as describe in association with FIG. 4A.

Returning to the description of FIG. 4A, upon appending the inserted location-specific page anchor to the URL for the cached copy of the ML document including the inserted page anchor at block 446, or upon appending the calculated distance offset to the URL for the ML document at block 430, or upon appending the existing page anchor, the direction indicator, and the calculated distance offset to the URL for the ML document at block 432, as described above, the process 400 stores the created hypertext link within the location-specific page anchor at block 448. The created hypertext link within the location-specific page anchor may be stored, for example, within the anchor storage area 218 of the database 216, or otherwise as suitable for a given implementation. At block 450, the process 400 returns the created hypertext link in response to the request for the link to the item of rendered web content and returns to decision point 402 to await another request for a link. The hypertext link may be returned via the display 204, via the memory 210 and stored within the anchor information storage area 212, or via any other suitable approach.

As such, the process 400 provides an example of a process for parsing a ML document in response to a request for a link to an item of rendered web content, and creating location-specific page anchors for the item of rendered web content in a variety of ways. Many additional variations on the example process 400 are possible and all are considered within the scope of the present subject matter.

As described above, a location-specific page anchor may be stored and forwarded to other computing devices, such as the computing device 110, to provide page anchors to specific items of rendered web content. Example processing for rendering the web content and the referenced item of web content is described below.

FIG. 5 is a flow chart of an example of an implementation of a process 500 for processing created location-specific page anchors. At decision point 502, the process 500 waits for a URL to be selected. When a determination is made that a URL has been selected, the process 500 retrieves a markup language (ML) document associated with the URL from a storage source at block 504. It should be noted that the URL may include a URL to an original ML document created by a content source with an appended location-specific page anchor. Alternatively, the URL may include a URL to a cached copy of an ML document with an inserted and appended location-specific page anchor. At block 506, the process 500 renders the web content.

At decision point 508, the process 500 makes a determination as to whether an anchor is appended to the URL for the ML document. When a determination is made that an anchor is not appended to the URL for the ML document, the process 500 makes a determination as to whether a distance offset is appended to the URL for the ML document at decision point 510. A distance offset may be appended to create a location-specific page anchor, as described above, when either an existing page anchor is not found proximate to the item reference, or when an existing page anchor is found but considered too far from the item reference and a top of the ML document is used as a reference rather than the existing page anchor.

When a determination is made that a distance offset is not appended to the URL for the ML document, the process 500 returns to decision point 502 to await another selection of a URL to process. When a determination is made that a distance offset is appended to the URL for the ML document, the process 500 scrolls the rendered web content from the top of the ML document based upon the distance offset at block 512 and returns to decision point 502 to await another selection of a URL to process. In such a situation, the rendered web content may scrolled to a position proximate to the item referenced by the location-specific page anchor in the form of a distance offset.

Returning to the description of decision point 508, when a determination is made that an anchor is appended to the URL for the ML document, the process 500 parses the ML document at block 514. At block 516, the process 500 determines a location of the appended page anchor. As described above, for an implementation where a copy of the ML document was cached with an inserted location-specific page anchor, the appended page anchor may include the inserted location-specific page anchor. Alternatively, a direction and a distance offset may be appended to the page anchor relative to an existing page anchor.

At decision point 518, the process 500 makes a determination as to whether a direction and a distance offset are appended to the page anchor. When a determination is made that a direction and a distance offset are not appended to the page anchor, the process 500 scrolls the rendered web content to the location of the inserted page anchor at block 520 and returns to decision point 502 to await another selection of a URL to process.

When a determination is made at decision point 518 that a direction indicator and a distance offset are appended to the page anchor, the process 500 determines a location within the ML document in the direction specified by the direction indicator and at the specified distance offset from the existing and appended page anchor at block 522. At block 524, the process 500 scrolls the rendered web content to the location within the ML document in the direction specified by the direction indicator and at the specified distance offset from the existing and appended page anchor and returns to decision point 502 to await another selection of a URL to process.

As such, the process 500 illustrates example processing for location-specific page anchors appended to URLs for ML documents useable to render web content. The example processing includes processing for appended location-specific page anchors that have been inserted into cached copies of ML documents, appended location-specific page anchors that include distance offsets from a top of an ML document, and appended location-specific page anchors that include a direction indicator and a distance offset from an existing page anchor within the ML document. Many other possibilities exist for processing location-specific page anchor and all are considered within the scope of the present subject matter.

As described above in association with FIG. 1 through FIG. 5, the example systems and processes provide automated configuration of location-specific page anchors. Many other variations and additional activities associated with automated configuration of location-specific page anchors are possible and all are considered within the scope of the present subject matter.

Those skilled in the art will recognize, upon consideration of the above teachings, that certain of the above examples are based upon use of a programmed processor such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   receiving a request, via an input device of a computing device, for a hypertext link to an item of web content rendered on a display of the computing device;
   determining whether a markup language (ML) document used to render the web content comprises an existing page anchor proximate to an item reference within the ML document used to render the item of web content, where determining whether the ML document used to render the web content comprises the existing page anchor proximate to the item reference within the ML document used to render the item of web content comprises determining that the ML document does not comprise the existing page anchor proximate to the item reference within the ML document;
   configuring the hypertext link based upon the determination of whether the ML document comprises the existing page anchor proximate to the item reference within the ML document used to render the item of web content, where configuring the hypertext link based upon the determination of whether the ML document comprises the existing page anchor proximate to the item reference within the ML document used to render the item of web content comprises:
      identifying a location of the item reference within the ML document;
      creating a page anchor for the item reference within the ML document;
      inserting the created page anchor into a copy of the ML document at the location associated with the item reference within the ML document;
      storing the copy of the ML document comprising the inserted page anchor;
      forming the hypertext link as a uniform resource locator (URL) to the stored copy of the ML document; and
      appending the inserted page anchor to the URL; and
   returning the configured hypertext link in response to the request.

2. The method of claim 1, where determining whether an ML document used to render the web content comprises an existing page anchor proximate to an item reference within the ML document used to render the item of web content comprises:
   parsing the ML document;
   determining the location of the item reference within the ML document; and parsing the ML document relative to the location of the item reference within the ML document in at least one of a reverse direction toward a beginning of the ML document and a forward direction toward an end of the ML document based upon the determined location of the item reference within the ML document.

3. The method of claim 1, where determining whether an ML document used to render the web content comprises an existing page anchor proximate to an item reference within the ML document used to render the item of web content comprises:
   determining that the ML document comprises the existing page anchor proximate to the item reference within the ML document;
   determining a direction from the existing page anchor to the item reference within the ML document;
   creating a direction indicator based upon the determined direction;
   calculating a distance offset from the existing page anchor to the item reference within the ML document; and
   where configuring the hypertext link based upon the determination of whether the ML document comprises the existing page anchor proximate to the item reference within the ML document used to render the item of web content comprises:
      forming the hypertext link as a uniform resource locator (URL) to the ML document; and
      appending the existing page anchor, the direction indicator, and the distance offset to the URL.

4. The method of claim 1, where determining whether an ML document used to render the web content comprises an existing page anchor proximate to an item reference within the ML document used to render the item of web content comprises:
   determining that the ML document comprises the existing page anchor beyond an existing page anchor threshold distance relative to the item reference within the ML document;
   calculating a distance offset from a top of the ML document to the item reference within the ML document; and
   where configuring the hypertext link based upon the determination of whether the ML document comprises the existing page anchor proximate to the item reference within the ML document used to render the item of web content comprises:
      forming the hypertext link as a uniform resource locator (URL) to the ML document; and
      appending the distance offset to the URL.

5. The method of claim 1, where determining whether an ML document used to render the web content comprises an existing page anchor proximate to an item reference within the ML document used to render the item of web content comprises:
   determining that the ML document does not comprise the existing page anchor proximate to the item reference within the ML document;
   calculating a distance offset from a top of the ML document to the item reference within the ML document; and
   where configuring the hypertext link based upon the determination of whether the ML document comprises the existing page anchor proximate to the item reference within the ML document used to render the item of web content comprises:
      forming the hypertext link as a uniform resource locator (URL) to the ML document; and
      appending the distance offset to the URL.

6. The method of claim 1, where the request comprises a user-selected direction indicator and further comprising:
   parsing the ML document in a direction identified by the user-selected direction indicator; and
   where determining whether an ML document used to render the web content comprises an existing page anchor proximate to an item reference within the ML document used to render the item of web content comprises determining whether the ML document comprises the existing page anchor in the direction identified by the user-selected direction indicator.

7. The method of claim 6, further comprising:
   determining that the ML document comprises the existing page anchor in the direction identified by the user-selected direction indicator;
   calculating a distance offset from the existing page anchor to the item reference within the ML document; and
   where configuring the hypertext link based upon the determination of whether the ML document comprises the existing page anchor proximate to the item reference within the ML document used to render the item of web content comprises:
      forming the hypertext link as a uniform resource locator (URL) to the ML document; and
      appending the existing page anchor, the user-selected direction indicator, and the distance offset to the URL.

8. The method of claim 1, where storing the copy of the ML document comprising the inserted page anchor comprises storing the copy of the ML document comprising the inserted page anchor in a cache memory and further comprising:
   configuring a caching duration for storage of the ML document comprising the inserted page anchor within the cache memory; and
   deleting the ML document comprising the inserted page anchor from the cache memory upon expiration of the caching duration.

9. A system, comprising:
   an input device;
   a display;
   a cache memory; and
   a processor programmed to:
      receive a request, via the input device, for a hypertext link to an item of web content rendered on the display;
      determine whether a markup language (ML) document used to render the web content comprises an existing page anchor proximate to an item reference within the ML document used to render the item of web content, where, in being programmed to determine whether the ML document used to render the web content comprises the existing page anchor proximate to the item reference within the ML document used to render the item of web content, the processor is programmed to determine that the ML document does not comprise the existing page anchor proximate to the item reference within the ML document;
      configure the hypertext link based upon the determination of whether the ML document comprises the existing page anchor proximate to the item reference within the ML document used to render the item of web content, where, in being programmed to configure the hypertext link based upon the determination of whether the ML document comprises the existing page anchor proximate to the item reference within the ML document used to render the item of web content, the processor is programmed to:
         identify a location of the item reference within the ML document;

create a page anchor for the item reference within the ML document;
insert the created page anchor into a copy of the ML document at the location associated with the item reference within the ML document;
store the copy of the ML document comprising the inserted page anchor within the cache memory;
form the hypertext link as a uniform resource locator (URL) to the stored copy of the ML document;
append the inserted page anchor to the URL;
configure a caching duration for storage of the ML document comprising the inserted page anchor within the cache memory;
delete the ML document comprising the inserted page anchor from the cache memory upon expiration of the caching duration; and
return the configured hypertext link in response to the request.

10. The system of claim 9, where, in being programmed to determine whether an ML document used to render the web content comprises an existing page anchor proximate to an item reference within the ML document used to render the item of web content, the processor is programmed to:
determine that the ML document comprises the existing page anchor proximate to the item reference within the ML document;
determine a direction from the existing page anchor to the item reference within the ML document;
create a direction indicator based upon the determined direction;
calculate a distance offset from the existing page anchor to the item reference within the ML document; and
where, in being programmed to configure the hypertext link based upon the determination of whether the ML document comprises the existing page anchor proximate to the item reference within the ML document used to render the item of web content, the processor is programmed to:
form the hypertext link as a uniform resource locator (URL) to the ML document; and
append the existing page anchor, the direction indicator, and the distance offset to the URL.

11. The system of claim 9, where, in being programmed to determine whether an ML document used to render the web content comprises an existing page anchor proximate to an item reference within the ML document used to render the item of web content, the processor is programmed to:
determine that the ML document does not comprise the existing page anchor proximate to the item reference within the ML document;
calculate a distance offset from a top of the ML document to the item reference within the ML document; and
where, in being programmed to configure the hypertext link based upon the determination of whether the ML document comprises the existing page anchor proximate to the item reference within the ML document used to render the item of web content, the processor is programmed to:
form the hypertext link as a uniform resource locator (URL) to the ML document; and
append the distance offset to the URL.

12. The system of claim 9, where the request comprises a user-selected direction indicator and where the processor is further programmed to:
parse the ML document in a direction identified by the user-selected direction indicator; and
where, in being programmed to determine whether an ML document used to render the web content comprises an existing page anchor proximate to an item reference within the ML document used to render the item of web content, the processor is programmed to determine whether the ML document comprises the existing page anchor in the direction identified by the user-selected direction indicator.

13. The system of claim 12, where the processor is further programmed to:
determine that the ML document comprises the existing page anchor in the direction identified by the user-selected direction indicator;
calculate a distance offset from the existing page anchor to the item reference within the ML document; and
where, in being programmed to configure the hypertext link based upon the determination of whether the ML document comprises the existing page anchor proximate to the item reference within the ML document used to render the item of web content, the processor is programmed to:
form the hypertext link as a uniform resource locator (URL) to the ML document; and
append the existing page anchor, the user-selected direction indicator, and the distance offset to the URL.

14. The system of claim 9, where, in being programmed to determine whether an ML document used to render the web content comprises an existing page anchor proximate to an item reference within the ML document used to render the item of web content, the processor is programmed to:
parse the ML document;
determine the location of the item reference within the ML document; and
parse the ML document relative to the location of the item reference within the ML document in at least one of a reverse direction toward a beginning of the ML document and a forward direction toward an end of the ML document based upon the determined location of the item reference within the ML document.

15. The system of claim 9, where, in being programmed to determine whether an ML document used to render the web content comprises an existing page anchor proximate to an item reference within the ML document used to render the item of web content, the processor is programmed to:
determine that the ML document comprises the existing page anchor beyond an existing page anchor threshold distance relative to the item reference within the ML document;
calculate a distance offset from a top of the ML document to the item reference within the ML document; and
configure the hypertext link in response to determining that the ML document comprises the existing page anchor proximate to the item reference within the ML document used to render the item of web content, the processor being programmed to:
form the hypertext link as a uniform resource locator (URL) to the ML document; and
append the distance offset to the URL.

16. The system of claim 9, where, in being programmed to store the copy of the ML document comprising the inserted page anchor, the processor is programmed to store the copy of the ML document comprising the inserted page anchor in the cache memory and the processor is further programmed to:
configure a caching duration for storage of the ML document comprising the inserted page anchor within the cache memory; and delete the ML document comprising the inserted page anchor from the cache memory upon expiration of the caching duration.

17. A computer program product comprising a computer readable storage medium including a computer readable program, wherein the computer readable program when executed on a computer causes the computer to:
- receive a request, via an input device, for a hypertext link to an item of web content rendered on a display;
- determine whether a markup language (ML) document used to render the web content comprises an existing page anchor proximate to an item reference within the ML document used to render the item of web content, where, in causing the computer to determine whether the ML document used to render the web content comprises the existing page anchor proximate to the item reference within the ML document used to render the item of web content, the computer readable program when executed on the computer causes the computer to determine that the ML document does not comprise the existing page anchor proximate to the item reference within the ML document;
- configure the hypertext link based upon the determination of whether the ML document comprises the existing page anchor proximate to the item reference within the ML document used to render the item of web content, where, in causing the computer to configure the hypertext link based upon the determination of whether the ML document comprises the existing page anchor proximate to the item reference within the ML document used to render the item of web content, the computer readable program when executed on the computer causes the computer to:
  - identify a location of the item reference within the ML document;
  - create a page anchor for the item reference within the ML document;
  - insert the created page anchor into a copy of the ML document at the location associated with the item reference within the ML document;
  - store the copy of the ML document comprising the inserted page anchor;
  - form the hypertext link as a uniform resource locator (URL) to the ML document stored; and
  - append the inserted page anchor to the URL; and
- return the configured hypertext link in response to the request.

18. The computer program product of claim 17, where, in causing the computer to determine whether an ML document used to render the web content comprises an existing page anchor proximate to an item reference within the ML document used to render the item of web content, the computer readable program when executed on the computer causes the computer to:
- parse the ML document;
- determine the location of the item reference within the ML document; and
- parse the ML document relative to the location of the item reference within the ML document in at least one of a reverse direction toward a beginning of the ML document and a forward direction toward an end of the ML document based upon the determined location of the item reference within the ML document.

19. The computer program product of claim 17, where, in causing the computer to determine whether an ML document used to render the web content comprises an existing page anchor proximate to an item reference within the ML document used to render the item of web content, the computer readable program when executed on the computer causes the computer to:
- determine that the ML document comprises the existing page anchor proximate to the item reference within the ML document;
- determine a direction from the existing page anchor to the item reference within the ML document;
- create a direction indicator based upon the determined direction;
- calculate a distance offset from the existing page anchor to the item reference within the ML document; and
- where, in causing the computer to configure the hypertext link based upon the determination of whether the ML document comprises the existing page anchor proximate to the item reference within the ML document used to render the item of web content, the computer readable program when executed on the computer causes the computer to:
  - form the hypertext link as a uniform resource locator (URL) to the ML document; and
  - append the existing page anchor, the direction indicator, and the distance offset to the URL.

20. The computer program product of claim 17, where, in causing the computer to determine whether an ML document used to render the web content comprises an existing page anchor proximate to an item reference within the ML document used to render the item of web content, the computer readable program when executed on the computer causes the computer to:
- determine that the ML document comprises the existing page anchor beyond an existing page anchor threshold distance relative to the item reference within the ML document;
- calculate a distance offset from a top of the ML document to the item reference within the ML document; and
- where, in causing the computer to configure the hypertext link based upon the determination of whether the ML document comprises the existing page anchor proximate to the item reference within the ML document used to render the item of web content, the computer readable program when executed on the computer causes the computer to:
  - form the hypertext link as a uniform resource locator (URL) to the ML document; and
  - append the distance offset to the URL.

21. The computer program product of claim 17, where, in causing the computer to determine whether an ML document used to render the web content comprises an existing page anchor proximate to an item reference within the ML document used to render the item of web content, the computer readable program when executed on the computer causes the computer to:
- determine that the ML document does not comprise the existing page anchor proximate to the item reference within the ML document;
- calculate a distance offset from a top of the ML document to the item reference within the ML document; and
- where, in causing the computer to configure the hypertext link based upon the determination of whether the ML document comprises the existing page anchor proximate to the item reference within the ML document used to render the item of web content, the computer readable program when executed on the computer causes the computer to:

form the hypertext link as a uniform resource locator (URL) to the ML document; and
append the distance offset to the URL.

22. The computer program product of claim 17, where the request comprises a user-selected direction indicator and where the computer readable program when executed on the computer further causes the computer to:
parse the ML document in a direction identified by the user-selected direction indicator; and
where, in causing the computer to determine whether an ML document used to render the web content comprises an existing page anchor proximate to an item reference within the ML document used to render the item of web content, the computer readable program when executed on the computer causes the computer to determine whether the ML document comprises the existing page anchor in the direction identified by the user-selected direction indicator.

23. The computer program product of claim 22, where the computer readable program when executed on the computer further causes the computer to:
determine that the ML document comprises the existing page anchor in the direction identified by the user-selected direction indicator;
calculate a distance offset from the existing page anchor to the item reference within the ML document; and
where, in causing the computer to configure the hypertext link based upon the determination of whether the ML document comprises the existing page anchor proximate to the item reference within the ML document used to render the item of web content, the computer readable program when executed on the computer causes the computer to:
form the hypertext link as a uniform resource locator (URL) to the ML document; and
append the existing page anchor, the user-selected direction indicator, and the distance offset to the URL.

24. The computer program product of claim 17, where, in causing the computer to store the copy of the ML document comprising the inserted page anchor, the computer readable program when executed on the computer causes the computer to store the copy of the ML document comprising the inserted page anchor in a cache memory and the computer readable program when executed on the computer further causes the computer to:
configure a caching duration for storage of the ML document comprising the inserted page anchor within the cache memory; and
delete the ML document comprising the inserted page anchor from the cache memory upon expiration of the caching duration.

\* \* \* \* \*